United States Patent [19]
Le et al.

[11] Patent Number: 5,819,087
[45] Date of Patent: Oct. 6, 1998

[54] FLASH ROM SHARING BETWEEN PROCESSOR AND MICROCONTROLLER DURING BOOTING AND HANDLING WARM-BOOTING EVENTS

[75] Inventors: Hung Q. Le, Katy; David J. Delisle, Spring; Maria Lucia Melo, Houston, all of Tex.

[73] Assignee: Compaq Computer Corporation, Houston, Tex.

[21] Appl. No.: 775,281

[22] Filed: Dec. 31, 1996

Related U.S. Application Data

[63] Continuation-in-part of Ser. No. 684,414, Jul. 19, 1996, Pat. No. 5,794,054.

[51] Int. Cl.[6] .................................................... G06F 9/06
[52] U.S. Cl. .......................................... 395/652; 395/830
[58] Field of Search ................................... 395/651, 652, 395/653, 200.5, 200.51, 200.52, 828, 830, 833, 834

[56] References Cited

U.S. PATENT DOCUMENTS

| | | | |
|---|---|---|---|
| 5,022,077 | 6/1991 | Bealkowski et al. | 380/4 |
| 5,269,022 | 12/1993 | Shinjo et al. | 395/652 |
| 5,327,549 | 7/1994 | Nissimov et al. | 395/652 |
| 5,410,707 | 4/1995 | Bell | 395/652 |
| 5,603,055 | 2/1997 | Evoy et al. | 395/652 |
| 5,701,477 | 12/1997 | Chejlaua, Jr. | 395/652 |

*Primary Examiner*—Kevin A. Kriess
*Attorney, Agent, or Firm*—Pravel, Hewitt & Kimball

[57] ABSTRACT

A computer system having a processor, a microcontroller, a flash ROM is provided with an address remapper for handling warm-boot events, and an arbiter for selectively assigning the ownership of the flash ROM to either the microprocessor or the microcontroller. The arbiter assigns the flash ROM initially to the microcontroller when power is initially provided to the system. After the flash ROM boots up and checks the integrity of the flash ROM and updates the content of the flash ROM with valid firmware if necessary, the microcontroller releases the flash ROM to the microprocessor to enable the computer system to proceed with the normal boot-up process. In this process, various system self tests are performed. Next, the microprocessor copies or shadows one or more portions of the flash ROM BIOS into a main memory array. After the shadow operation, the processor sets a remap bit to indicate that the ROM BIOS content has been copied into the main memory array. The setting of the remap bit enables the remapper to deflect accesses to the flash ROM. The restarting of the clock signal to the microcontroller to switch the ownership of the flash ROM back to the microcontroller. In the event that the microprocessor needs to regain access to the flash ROM contents, the microprocessor writes to the mailbox register of the arbiter to request access to the flash ROM. The microprocessor waits for a confirmation from the arbiter that the microcontroller is entering an idled mode. Next, the microprocessor halts the clock of the microcontroller. These events cause the microcontroller to float or tristate the signal lines going from the microcontroller to the flash ROM such that the microprocessor can drive the signal lines without any conflict potentials. In this manner, the microprocessor can still access the shared flash ROM after it has booted up. Thus, the system cost is reduced, the system reliability is enhanced, while the system accessibility to the flash ROM after the boot-up period is still preserved.

34 Claims, 11 Drawing Sheets

FLASH ROM SHARING BETWEEN PROCESSOR AND MICROCONTROLLER DURING BOOTING AND HANDLING WARM-BOOTING EVENTS

CROSS-REFERENCE TO RELATED APPLICATIONS

This is a continuation-in-part of co-pending U.S. patent application Ser. No. 08/684,414, filed on Jul. 19, 1996 now U.S. Pat. No. 5,794,054.

BACKGROUND OF THE INVENTION

1. Field of the Invention

The present invention relates to the sharing of a resource among consumers, and more specifically, to the sharing of a read-only-memory (ROM) device between processors in a computer system.

2. Description of the Related Art

The rapid acceptance of computer technology by corporations as well as consumers has led to the widespread use of computers. Further abetting this process is the continual reduction in size and cost of personal computers. Originally, personal computers were large items best suited for floor standing or desktop use. Eventually, they became smaller so that desktop use became the standard. Improvements in processor, memory and data storage capabilities have resulted in light weight, powerful mobile computers such as portables, luggables, laptops, notebooks, palm top and personal digital assistants. These computers can provide sufficient processing capability for audio visual applications, such as computer aided design, three dimensional animation, and multimedia presentation, even when used at remote locations.

Regardless of the computer's status as desktop or a portable computer, today's modern personal computer typically includes a microprocessor, a memory system, data storage devices, and input/output (I/O) devices such as a display, a keyboard, a mouse, and communication devices, among others. The computer system is typically initialized, or boot-strapped, during a power up sequence using system software and information representing a sequence of internal control variables stored within a system read-only-memory (ROM). Since the system ROM is non-volatile, the content of the ROM contains valid data or instructions so that the computer system can be reliably boot-strapped to a point where the disk operating system (DOS) can be loaded to complete the boot-up sequence.

One computer system utilizing the ROM-based boot code approach is the IBM personal computer (PC) developed by the IBM Corporation of Armonk, N.Y. In an IBM PC or an IBM compatible PC system, the system ROM stores the Basic Input/Output System (BIOS) which is executed upon power-up by the microprocessor to initialize the system, to perform a power on self-test (POST) and to provide certain low level, hardware dependent support for the display, floppy/hard disk drives, and communication devices. More sophisticated routines and data may be included in the system ROM, depending upon the needs and complexity of a given computer system.

In the original PC architecture, the BIOS code was fairly straight forward and required little memory space (about 32 KB total). BIOS code provides the lowest level of interface between the operating system and the hardware. It normally is located at the top of memory for the original 8088 system of the original PC. In the original IBM PC architecture, the BIOS code is stored beginning at F8000h. Following a system reset or power-on, the typical system first goes to the high memory area of the I megabyte memory map, where the boot code is stored. Further, a checksum routine is typically executed to verify the status of the BIOS currently available to the system. If the integrity of the BIOS is determined to be good, the boot code initializes the system and its peripherals and passes control to the operating system. This is done by jumping to the address pointed to by a jump vector. If the BIOS is found to be corrupted or unusable (i.e., the computed checksum value does not match the expected value), the computer system indicates a system failure. In such instances, the BIOS ROM needs to be replaced.

Recently, a large capacity, reprogrammable storage device called a flash ROM is used to store the POST and BIC)S routines required for the initialization and operation of the computer system. As the flash ROM can be reprogrammed without being removed from the system, the flash ROM provides a more expeditious and less costly solution over conventional ROMs when software updates are required.

In addition to the microprocessor, other processing devices are also present in a modern computer. These processing devices can be a coprocessor for performing specialized processing, a digital signal processor for handling modem, video and signal processing requirements, and one or more microcontrollers which handle the peripheral devices and offload the processing from the microprocessor. For instance, a microcontroller such as an 8051-compatible microcontroller may be used to interface with the keyboard as well as other I/O devices of the computer system. These processing devices also require one or more ROMs to store their operating code.

Typically, the microcontroller has a small amount of on-chip ROM and RAM to enable the microcontroller to operate with a minimum part count. However, certain applications require more storage space than available with the built-in ROM on the microcontroller. In these instances, the microcontroller may require an external ROM device to handle more sophisticated application software. However, an additional ROM device undesirably adds cost to the system. Further, the increase in the part count decreases the overall reliability of the computer, as these additional components increase the possibility of a failure. Thus, it is desirable to share a ROM between the microcontroller and the microprocessor, As the flash ROM storing the BIOS and POST codes is typically a high capacity device, the flash ROM usually has spare storage capacity to accept codes intended for the microcontroller. In previous portable computers, the flash ROM is shared between the microprocessor and a keyboard controller such as an 8051 microcontroller. In such systems, the microprocessor initially owns the flash ROM during the power-on reset and boot-up. After the microprocessor has verified system functionality using the POST codes, the microprocessor copies the BIOS contents stored in the flash ROM to its main memory array in an operation called "shadowing" to enhance the performance of the computer system, as the access speed to the main memory array is much faster than the access speed to the flash ROM. After the microprocessor has copied the BIOS contents of the flash ROM into the main memory array, the microprocessor only needs to occasionally access the flash ROM such as to reprogram the flash ROM. In the prior art, the microcontroller retains ownership of the flash ROM until the computer system is reset by the cycling of power to the computer system or until the computer system writes to a control register to regain control of the flash ROM. However, in the prior art, once control of the flash ROM is handed to the computer system, the microcontroller can no longer access the flash ROM until the system has been rebooted.

Although the sharing of the flash ROM between the processor and the microcontroller results in a system which is more efficient and economically desirable, the prior art sharing approach is undesirable in that, once the ownership of the flash ROM has been surrendered to the microcontroller, the microprocessor can access the flash ROM for purposes such as reprogramming the flash ROM, but it cannot return control to the microcontroller. Thus, the prior art solution requires that the entire content of the shared flash ROM be shadowed in the RAM such that all data stored in the flash ROM are accessible. However, as the flash ROM may store a number of optional data which may never be used such as language options and plug-and play peripheral parameters, it is not desirable to copy fully the contents of the flash ROM into the main memory, as a full "shadow" backup in the main memory array unnecessarily consumes valuable main memory storage space.

Alternatively, key code segments of the flash ROM can be shadowed to economize on main memory consumption. However, on certain occasions, the computer system may need to access optional data stored on the flash ROM but not shadowed in the main memory array. Thus, the computer system may need to access to the flash ROM after it has released the ownership of the flash ROM to the microcontroller. Further, the "shadowed" version may occasionally be corrupted, necessitating a reload of the code and data images stored in the shared flash ROM. In such events, it is desirable to access the code and data images without requiring the system to be rebooted.

One problem with shadowing the flash ROM occurs when a warm reboot is invoked using a combination of the Control-Alt-Delete buttons on the IBM PC. Such a warm reboot may cause the processor to access the resource or flash ROM after it has released ownership of the flash ROM to the microcontroller, while the microcontroller is still asserting ownership of the flash ROM. In such event, a system lock-up would occur due to the contention for the shared resource or flash ROM between the processor and the microcontroller. Such lock-up possibility introduces instability to the computer system and is thus undesirable.

SUMMARY OF THE INVENTION

In accordance with the invention, a computer system having a processor, a microcontroller, and a flash ROM, is provided with an address remapper for handling warm-boot events and an arbiter for selectively assigning the ownership of the flash ROM to either the microprocessor or the microcontroller. The arbiter assigns the flash ROM initially to the microcontroller when power is first applied to the system. After the microcontroller boots up and checks the integrity of the flash ROM and updates the content of the flash ROM with valid firmware if necessary, the microcontroller releases the flash ROM to the microprocessor to enable the computer system to proceed with the normal boot-up process. In this process, various system self tests are performed. Next, the microprocessor copies or shadows one or more portions of the flash ROM BIOS into a main memory array. After the shadow operation, the processor sets a remap bit to indicate that the ROM BIOS content has been copied into the main memory array. The setting of the remap bit enables the remapper to deflect accesses to the flash ROM, typically residing at FFFFXXXXh, to the shadowed memory locations preferably located at 000FXXXXh. Thus, warm reboots will be executed from the shadowed ROM BIOS which eliminates conflicts with the microcontroller.

After the processor successfully cold-boots, the processor releases the flash ROM back to the microcontroller by restarting the clock of the microcontroller and writing a command to a mailbox register in the arbiter which takes the microcontroller out of idle mode. In the event that the microprocessor needs to regain access to the flash ROM contents, the microprocessor writes to a register of the arbiter to request access to the flash ROM. The microprocessor waits for a confirmation from the arbiter that the microcontroller is entering an idle mode. Next, the microprocessor halts the clock of the microcontroller. These events cause the microcontroller to float, or tristate, the signal lines from the microcontroller to the flash ROM such that the microprocessor can drive the signal lines without conflict. In this manner, the microprocessor can still access the shared flash ROM in a controlled manner after the system has booted up. Furthermore, warm reboots which may occur at random are executed from the shadowed ROM BIOS in the main memory to avoid conflicts with the microcontroller since the microcontroller may still assert ownership of the flash ROM when the warm boot occurs. Thus, by sharing the resource flash ROM, the system cost is reduced, the system reliability is enhanced, while accessibility to the flash ROM after the boot-up process is still preserved.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 08/324,246, filed on Oct. 14, 1994, now U.S. Pat. No. 5,634,073, entitled "MEMORY CONTROLLER WITH WRITE POSTING QUEUES FOR PROCESSOR AND I/O BUS OPERATIONS AND ORDERING LOGIC FOR CONTROLLING THE QUEUES," by Michael J. Collins, Gary W, Thome, Michael Moriarty, Jens K. Ramsey and John E. Larson;

U.S. application Ser. No. 08/684,686, filed on Jul. 19, 1996, now U.S. Pat. No. 5,684,382, entitled "IMPROVED CONTROL OF COMPUTER AC ADAPTER OUTPUT VOLTAGE VIA BATTERY PACK FEEDBACK," by Brian C. Fritz, William C. Hallowell, Thomas P. Sawyers, Norman D. Stobert, Robert F. Watts and Michael E. Schneider.

U.S. application Ser. No. 08/684,420, filed on Jul. 19, 1996, entitled "MULTIFUNCTION POWER AND KEYBOARD CONTROLLER," by David J. Delisle, William C. Hallowell and Patrick R. Cooper.

U.S. application Ser. No. 08/684,413, filed on Jul. 19, 1996, entitled "FLASH ROM PROGRAMMING," by Patrick R. Cooper, David J. Delisle and Hung Q. Le;

U.S. application Ser. No. 08/684,486, filed on Jul. 19, 1996, now U.S. Pat. No. 5,793,995, entitled "BUS SYSTEM FOR SHADOWING REGISTERS," by Dwight D. Riley and David J. Maguire;

U.S. application Ser. No. 08/684,412, filed on Jul. 19, 1996, entitled "CIRCUIT FOR HANDLING DISTRIBUTED ARBITRATION IN A COMPUTER SYSTEM HAVING MULTIPLE ARBITERS," by David J. Maguire, Dwight D. Riley and James R. Edwards;

U.S. application Ser. No. 08/684,485, filed on Jul. 19, 1996, entitled "LONG LATENCY INTERRUPT HANDLING AND INPUT/OUTPUT WHILE POSTING," by David J. Maguire and James R. Edwards;

U.S. application Ser. No. 08/684,710, filed on Jul. 19, 1996, now U.S. Pat. No. 5,748,911, entitled "SERIAL BUS SYSTEM FOR SHADOWING REGISTERS," by David J. Maguire and Hung Q. Le;

U.S. application Ser. No. 08/684,584, filed on Jul. 19, 1996, entitled "APPARATUS AND METHOD FOR POSITIVELY AND SUBTRACTIVELY DECODING ADDRESSES ON A BUS," by Gregory N. Santos, James R. Edwards, Dwight D. Riley and David J. Maguire;

U.S. application Ser. No. 08/671,316, filed on Jul. 19, 1996, now U.S. Pat. No. 5,781,748, entitled "TWO ISA BUS CONCEPT," by Gregory N. Santos, David J. Maguire, Dwight D. Riley and James R. Edwards;

U.S. application Ser. No. 08/684,490, filed on Jul. 19, 1996, now U.S. Pat. No. 5,761,460, entitled "RECONFIGURABLE, DUAL MASTER IDE INTERFACE," by Gregory N. Santos, David J. Maguire, William C. Hallowell and James R. Edwards; and U.S. application Ser. No. 08/684,255, filed on Jul. 19, 1996, entitled "COMPUTER SYSTEM INCORPORATING HOT DOCKING AND UNDOCKING CAPABILITIES WITHOUT REQUIRING A STANDBY OR SUSPEND MODE," by Richard S. Lin, David J. Maguire, James R. Edwards and David J. Delisle; all of which are assigned to the assignee of this invention.

Figure 1A:
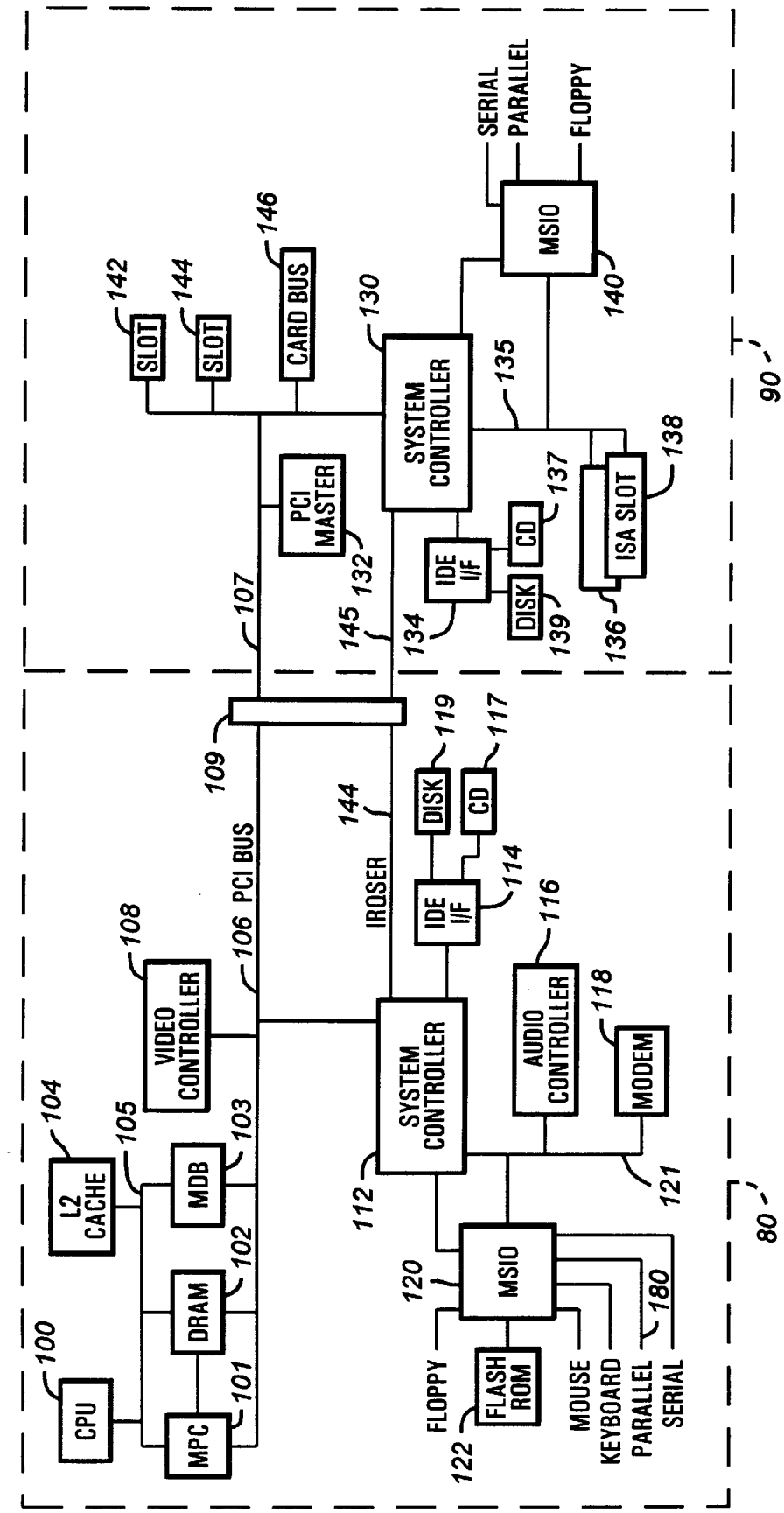
FIG. 1A is a block diagram of a computer system having a flash ROM sharing device in accordance with the present invention.

Turning now to the drawings, FIG. 1A is a computer system S according to the present invention. In FIG. 1A the system S comprises a portable computer 80 and an expansion base unit 90. Within the portable computer 80, a CPU 100 and a level two (L2) cache 104 are connected to a high speed local bus 105. The processor 100 of the preferred embodiment is one of the 80X86 microprocessor family manufactured by Intel Corporation of Santa Clara, Calif. In the preferred embodiment, the processor operates with a standard IBM-PC compatible operating system, such as MS-DOS or Windows, available from Microsoft Corporation of Redmond, Wash. The L2 cache 104 provides additional caching capabilities to the processor's on-chip cache to improve performance.

In addition to the CPU 100 and cache 104, a number of memory interface and memory devices are connected between the local bus 105 and a PCI bus 106. These devices include a memory to PCI cache controller (MPC) 101, a dynamic random access memory (DRAM) array 102, and a memory data buffer (MDB) 103. The MPC 101 is connected to the DRAM array 102, which is further connected to the MDB 103. The MPC 101, DRAM array 102, and MDB 103 collectively form a high performance memory system for the computer system S. A video controller 108 is also connected to a PCI bus 106.

The PCI bus 106 is also connected to a system controller 112. The system controller 112 is a PCI to ISA bus bridge which also provides various support functions for the portable computer 80 and the expansion base unit 90 of the system S. Preferably the system controller 112 is a single integrated circuit that acts as a PCI bus master and slave, an ISA bus controller, an ISA write posting buffer, an ISA bus arbiter, DMA devices, and an IDE disk interface. The system controller 112 is connected to an audio controller 116 and a modem 118 as conventionally present in PC systems to provide sound and data communication capabilities for the system S via a first ISA interface 121. The system controller 112 is also connected to an IDE interface port 114 for driving one or more peripheral devices such as hard disk drives, preferably a CD-ROM player 117 and a disk drive 119. The peripheral devices such as the disk drives typically store boot data used during the initial power up of the computer system. Further, the system controller 112 provides a single pin output to support an interrupt serial bus (IRQSER) 144.

The system controller 112 is connected to an MSIO (mobile super I/O) chip 120. The MSIO 120 is connected to a flash ROM 122. The flash ROM 122 receives its control, address and data signals from the MSIO 120. Preferably, the flash ROM 122 contains the BIOS information for the computer system S and can be reprogrammed to allow for revisions of the BIOS. Additionally, the MSIO 120 provides a parallel port 180, a serial port, a floppy interface, a keyboard interface and a mouse interface, among others, for the computer system S.

A plurality of Quick Connect switches 109 are also connected to the PCI bus 106. Upon detecting a docking sequence between the portable computer 80 and the base unit 90, the Quick Connect switches 109 couple the PCI bus 106 and the IRQSER bus 144 to an expansion PCI bus 107 and an expansion IRQSER bus 145 on the base unit 90. The Quick Connect switches 109 are series in-line FET transistors having low $r_{ds}$, or turn-on resistance, values to minimize the loading on the PCI buses 106 and 107 and the IRQSER buses 144 and 145.

Turning now to the expansion base unit 90, one or more PCI masters 132 are connected on the expansion PCI bus 107, which is adapted to be connected to the PCI bus 106 over the Quick Switches 109 when the portable computer 80 is docked to the expansion base unit 90. The PCI bus 107 is also connected to PCI slots 142 and 144 and also to a card-bus interface 146 for accepting expansion cards. Also connected to the expansion PCI bus 107 is a second system controller 130, which is preferably a second integrated circuit of the same type as the system controller 112. The system controller 130 is configured to be the slave upon power up. As a slave, the write posting buffer is not available in the system controller 130. The system controller 130 is connected to the expansion PCI bus 107 and the interrupt serial bus 145. The system controller 130 supports additional drives 137 and 139 through an the IDE interface 134. The system controller 130 also supports an ISA bus 135 which is connected to one or more ISA slots 136–138. The system controller 130 is further connected to a second MSIO device 140, which provides a secondary parallel port, serial port, and floppy interface.

Thus, the system S, upon docking, may have multiple parallel ports, serial ports, keyboards, mice, and disk drives via keyboards, mice, and disk drives via the system controllers 112 and 130. Additionally, the system S may have a plurality of PCI and ISA type peripherals on their respective buses. The availability of a plurality of slots allows more peripherals to be connected to the system S and contributes to the useability and flexibility of the portable computer 80 when it is docked to the expansion base unit 90.

Figure 1B:
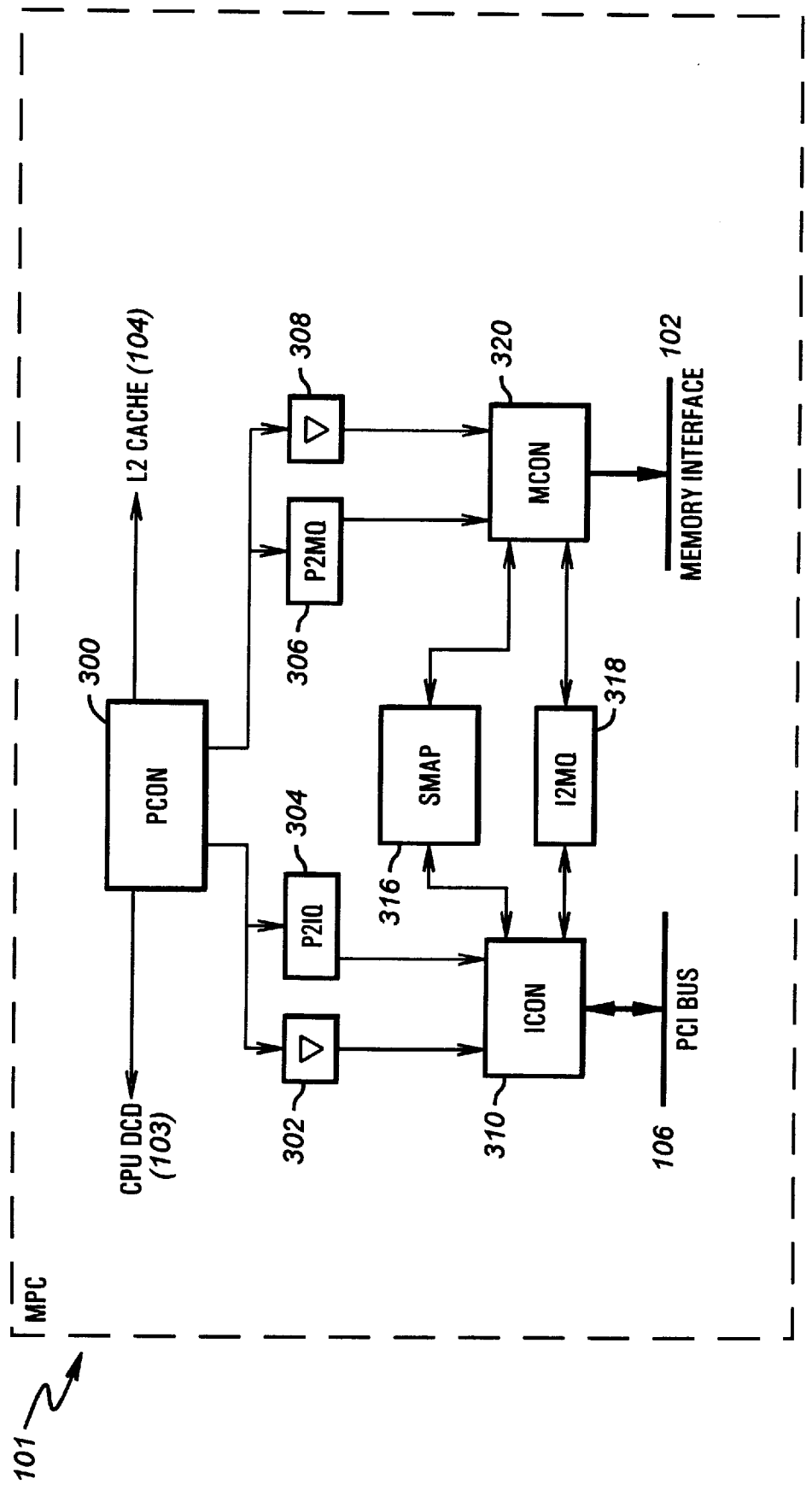
FIG. 1B is a block diagram of a memory processor controller (MPC) of the computer system of FIG. 1A of the present invention.

Referring to FIG. 1B, a more detailed view of the memory processor control (MPC) 101 is shown. The MPC 101 has three major functional interfaces: a processor/L2 cache control (PCON) 300, a memory control (MCON) 320, and a PCI control (ICON) 310. Each of these control blocks operates independent of the others. Cycles are passed between the blocks using queues and read request registers. Three queues are implemented in the MPC 101: a processor-to-memory queue (P2MQ) 306, a processor-to-PCI queue (P2IQ) 304, and a PCI-to-memory queue (I2MQ) 318. The P2MQ 306 handles posted writes to memory. The P2IQ 304 handles posted writes to the PCI bus 106. The I2MQ 318 handles PCI writes to memory and PCI reads from memory. Preferably, the I2MQ 318 is a content addressable memory (CAM) to allow each element in the I2MQ queue 318 to be snooped simultaneously. Further, processor-to-memory reads and processor-to-PCI reads are handled through simple registers 302 and 308 which are optimized for read performance. In sum, each of the blocks PCON 300, ICON 310 and MCON 320 communicate with each other through queues P2IQ 304, P2MQ 306, I2MQ 318, and read registers 302 and 308. The separation of the major blocks of the MPC 101 allows for a significant amount of concurrency. Thus, in the preferred embodiment, the MPC 101 is capable of processing up to 16 cycles at any given time. The details of these blocks are further described in the previously incorporated U.S. Pat. No. 5,634,073 which is entitled "MEMORY CONTROLLER WITH WRITE POSTING QUEUES FOR PROCESSOR AND I/O BUS OPERATIONS AND ORDERING LOGIC FOR CONTROLLING THE QUEUES."

Figure 1C:
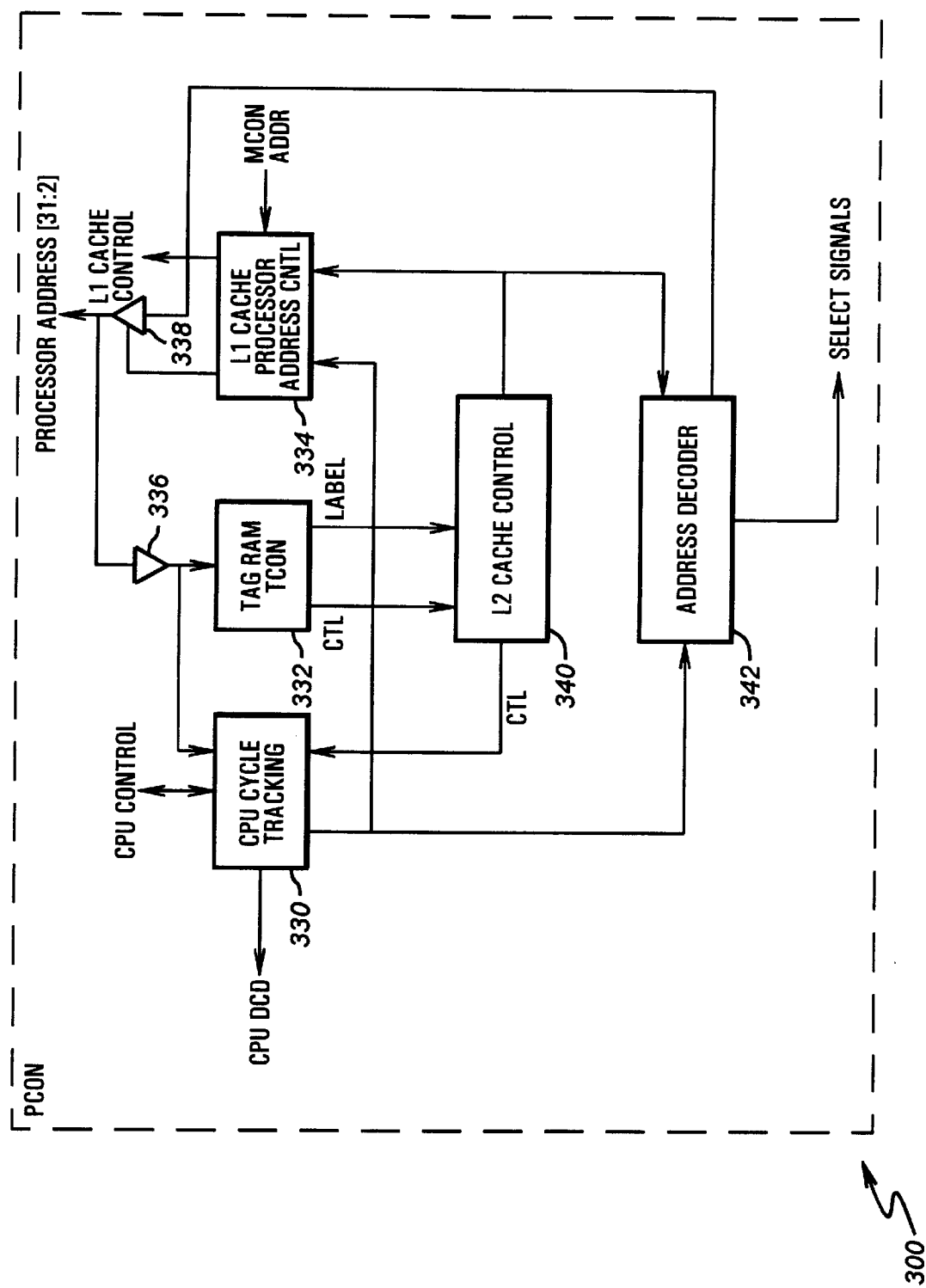
FIG. 1C is a more detailed block diagram of the processor controller block of FIG. 1B in accordance with the present invention.

Turning now to FIG. 1C, a more detailed block diagram of the PCON 300 is shown. The PCON 300 essentially performs the tasks of decoding the processor 100 cycles, running snoops to a level 1 (L1) cache internal to the CPU 100, and additional logic, such as the mode speed control and soft reset remapping of the present invention. In FIG. 1C, a CPU cycle tracker 330 is provided to track various cycles that the processor can run, such as PCI reads, PCI writes, memory reads, memory writes. The processor cycle tracker 330 also is connected to the CPU DCD bus of the NIDB 103.

In addition, the PCON 300 has a tag RAM control unit (TCON) 332 and the L1 cache processor address control 334. The TCON 332 and the address control block 334 are connected to the processor address bus via a plurality of buffers 336 and 338. Furthermore, the TCON 332 drives the inputs of a level 2 (L2) cache control block 340 whose output is provided to the CPU cycle tracker 330 and the L1 cache processor address control block 334. The L2 cache control block 340 and the CPU cycle tracker 330 are also connected to an address decoder 342 which generates address select signal outputs. The address decoder 342 is also connected to the processor address bus via the buffer 338 to effect changes in the address signal from the processor 100. The address decoder 342 in turn houses the address remapper of the present invention.

Figure 1D:
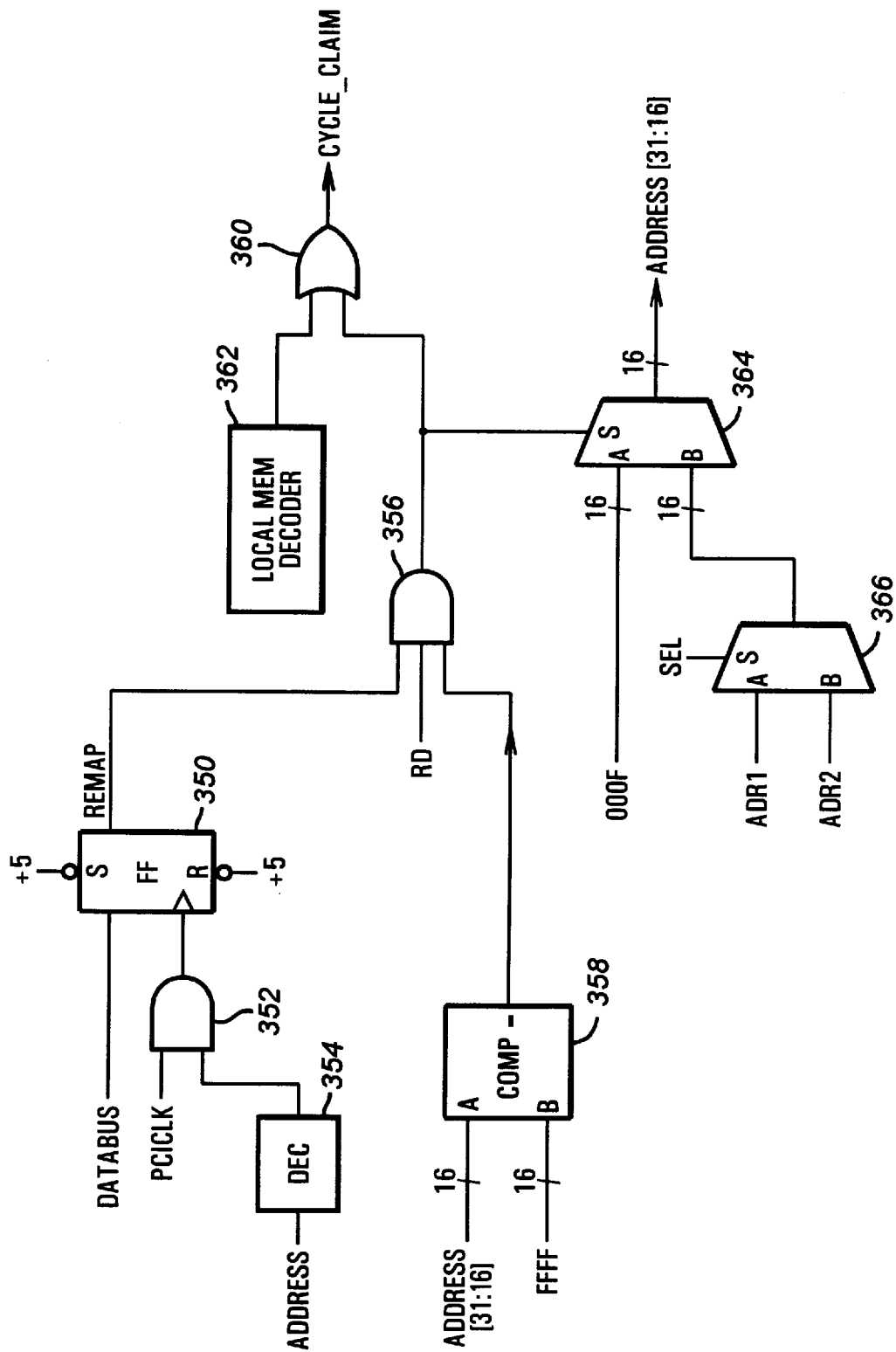
FIG. 1D is a more detailed schematic block diagram of the address remapping logic of the address decoder of FIG. 1C in accordance with the present invention.

Turning now to FIG. 1D, the address remapper R is schematically shown in detail. In FIG. 1D, a flip-flop 350 stores a remap bit. The flip-flop 350 is connected to one line of the data bus. Furthermore, the flip-flop is clocked by an AND gate 352 which receives the PCI clock signal as well as an output from a decoder 354. The decoder 354 detects accesses to the remap flip-flop. In combination, the decoder 354 and the AND gate 352 cause the flip-flop 350 to sample the data bus and to store the appropriate remap value when written to by the processor 100. Thus, the remap bit output of the flip-flop 350 is controllably asserted or deasserted as needed.

Also connected to the upper 16 bits of the address bus is a comparator 358. The comparator 358 receives a constant FFFFh at the B input. The output of the comparator 358 is provided to one input of an AND gate 356. The other inputs of the AND gate 356 are connected to the output of the flip-flop 350 which stores the remap bit and to the processor read signal. Thus, the AND gate 356 is asserted whenever the remap bit is set (indicating that the ROM has been shadowed), and the address being read from equals FFFFXXXXh. When these conditions are true, the output of the AND gate 356 is asserted to allow the remapper R to change the address to divert the access directed to the flash ROM 122 to the shadowed memory region in the main memory array 102. In addition to the AND gate 356, one or more additional local memory decoders 362 may be present to decode cycles targetted to main memory which have to be claimed by the MPC and further relating to the logic for generating the SEL signal for the multiplexer 366.

The output of the AND gate 356 and the additional decoders 362 are provided to an OR gate 360 to present CYCLE_CLAIM, a signal used to claim bus cycles for the main memory. The output of the AND gate 356 is also provided to the select input of a multiplexer 364. The multiplexer 364 is in turn connected to a constant value 000Fh at the A input, while the B input of the multiplexer 364 is connected to the output of one or more multiplexers 366 which present the actual or modified address values to the B input of the multiplexer 364. The multiplexer 366 is in turn connected to one or more address values, as provided to the A and B inputs of the multiplexer 366. Furthermore, the multiplexer 366 is driven by one or more select signals SEL as appropriate to select the original address values or modified values.

In any event, when the processor 100 performs a warm reboot which accesses the last 16 bytes of the processor address bus, the address remapper R of the present invention replaces the actual address value with 000Fh as described next. In the event that the remap bit is set, indicating that the ROM 122 had been shadowed, and a read operation is performed to the upper address locations FFFFXXXXh, the AND gate 356 output is asserted which in turn causes a constant 000Fh to be provided to the high order lines of the address bus. Preferably, the value 000Fh is provided into the upper four nibbles of the address bus. Thus, during a warm boot where the contents of the flash ROM have already been shadowed to the local memory, an access to the ROM BIOS located at FFFFXXXXh would be diverted to the shadowed ROM located at 000FXXXXh in the main memory array rather than the flash ROM 122 to avoid a conflict if the microcontroller is still asserting ownership of the flash ROM 122. Thus, the remapper R of the present invention allows the shadowed ROM to be used during unpredictable events associated with the warm reboot.

Furthermore, the present invention contemplates that a flag and a multiplexer could be utilized to substitute the preferred address of 000FXXXXh into FFFFXXXXh for flash ROM 122 remapping purposes. The present invention also contemplates that other ways for substituting the address may be utilized. For instance, a hard coded jump to a fixed location in the shadowed RAM may be utilized, is disclosed in U.S. patent application Ser. No. 08/608,289, entitled "RESETTING A CPU", by Kenneth W. Arnold and Rajesh A. Shaw, assigned to the assignee of the present invention, and hereby incorporated by reference. As disclosed in "RESETTING A CPU,", when the processor 100 fetches code from the ROM 122, the instruction is decoded and diverted such that a jump into the ROM 122 is intercepted and transparently recoded to cause a jump to the shadowed ROM address in the main memory array 102. In such system, the alias shadowed ROM is also substituted whenever the processor accesses very high addresses where the actual ROM is located.

Figure 2:
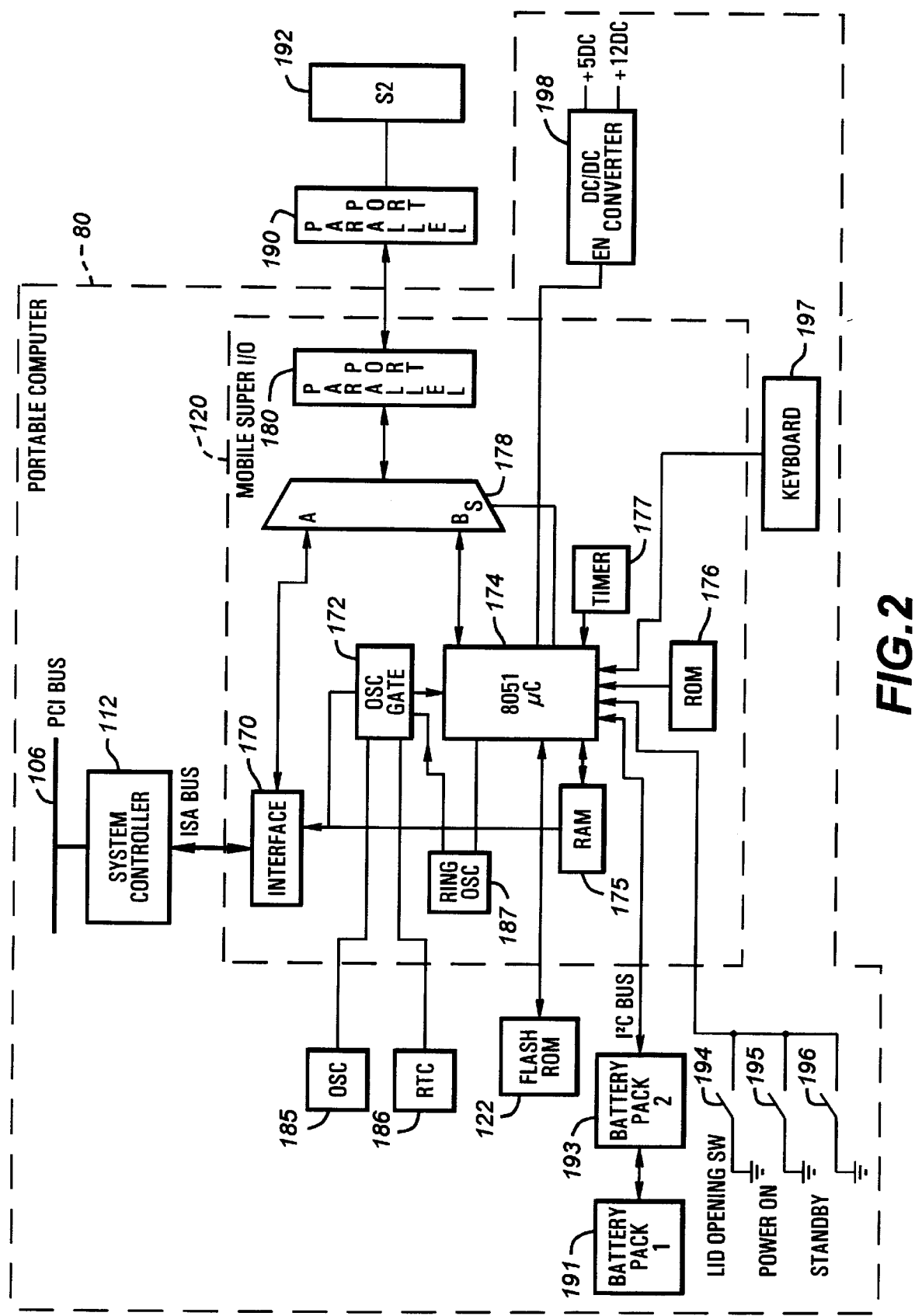
FIG. 2 is a more detailed schematic block diagram of the flash ROM sharing device of the present invention.

Turning to FIG. 2, the circuitry for sharing the flash ROM 122 between a microcontroller and a microprocessor during the controlled environment after the processor 100 had booted-up is disclosed. In FIG. 2, operations directed at the ISA expansion bus are communicated over the PCI bus 106 and directed at the system controller 112. The system controller 112 communicates with the super I/O device 120 over the ISA bus. In the super I/O device 120, an interface unit 170 is connected to the ISA bus for receiving instructions from the CPU 100. The interface, 170 provides a number of "mailbox" registers mapped into the I/O memory space to facilitate the interprocessor communication and coordination between the CPU 100 and a microcontroller 174. The interface 170 is connected to the enable input of an oscillator gating circuit 172 to allow the CPU 100 to control the generation of the clock to the microcontroller 174. The oscillator gating circuit, or the variable clock generator, 172 receives a clock signal which is externally generated by an oscillator 185. The oscillator gating circuit or variable clock generator 172 preferably receives a 14 MHz clock signal from the oscillator 185 and generates a programmable clock output that can be selected from 0 MHz, 12 MHz, 14 MHz, or 16 MHz. The oscillator 185 is active when the computer system 80 is in the on state.

Further, a 32 Khz crystal 161 is connected to the MSIO 120 to clock the real time clock (RTC) circuit (not shown), to clock the 8051 microcontroller 174 when it is in a deep sleep mode, and to clock other portions of the MSIO 120. The deep sleep mode is an ultra low power mode where most sections of the microcontroller 174 are shut down to conserve power. This mode is a special mode that is provided as an enhancement to a standard 8051-compatible microcontroller cell. The deep sleep mode is entered when the standard 8051 IDLE instruction is executed with a particular register bit set. In this mode, the microcontroller 174 assumes that it will operate off a ring oscillator 187 and thus arms the ring oscillator 187 such that the ring oscillator 187 will wake up when certain events such as interrupts are presented to the microcontroller 174.

As discussed above, the internal ring oscillator 187 is connected to the oscillator gating circuit 172 to provide clock signals to the microcontroller 174 when the computer system 80 is in the standby mode or when the microcontroller comes out of its deep sleep. The ring oscillator 187 consists essentially of a number of inverters connected together in a looped series arrangement, with a pass transistor connected between the output of one inverter and the input of another inverter such that, upon turning off the pass transistor, the feedback is broken and the oscillation stops. The control gate of the pass transistor is connected to the microcontroller 174 such that the microcontroller 174 can wake up the ring oscillator 187 when certain internal and external events are encountered. The external events that wake up the microcontroller 174 include the actuation of the ring indicator from the modem, the standby button, the hibernation button, PCMCIA card detect, and the PCMCIA ring indicator. The internal events which wake up the microcontroller 174 include events relating to the real time clock alarm, the hibernation time, the keyboard, and the mouse, among others. The ring oscillator is available as a standard ASIC module from SM,C Corporation of Hauppauge, N.Y. Finally, the output of the oscillator gating circuit 172 is provided to the clock input of the 8051 compatible microcontroller 174.

Other than the special clock circuits discussed above for the deep sleep feature, the 8051 compatible microcontroller 174 has a random access memory (RAM) 175 and a read only memory (ROM) 176 for storing boot-up instructions. The microcontroller 174 has a built-in timer 177 named Timer_0 which may be used to allow the microcontroller 174 to detect failures when the timer time-outs. The timer 177 is a count-up timer which interrupts at the rollover point. The timer 177's duration and count-up sequencing are controlled by the microcontroller 174. The timer 177 generates an interrupt to the microcontroller 174 upon completion of its count sequence. The generation of the interrupt to the microcontroller 174 wakes the microcontroller 174 out of its idle mode so that the processing of the routines of the present invention can be performed. The timer 177 is used as a fail-safe mechanism to wake up the microcontroller in the event of power failures and other abnormal operating conditions.

Although a conventional timer can be used, the present invention also contemplates that a watchdog timer can be used in place of the timer 177. In the event that the watchdog timer is used, the software overhead on the microcontroller 174 is reduced, as the watchdog timer will reset the microcontroller 174 in event of an abnormal program execution. If the watchdog timer is not periodically reset by the microcontroller 174, the counter in the watchdog timer overflows, causing the microcontroller 174 to be reset. The watchdog timer thus restarts the microcontroller 174 in abnormal situations, providing for recovery from a hardware or software error.

The microcontroller 174 is also connected to the select input of a two-to-one multiplexer 178. The B input of the multiplexor 178 is connected the input/output lines of the microcontroller 174. The A input of the multiplexor 178 is connected to the interface 170 for transferring data from the parallel port directly to the processor 100 via the system controller 112. The microcontroller 174 has an output connected to the select input S of the multiplexor 178 to control the routing of data from the parallel port 180 to either the interface 170 or the microcontroller 174. The output of the multiplexor 178 is connected to the parallel port 180. The interface 170 and the microcontroller core 174 are connected to the flash ROM 122. Finally, the parallel port 180 communicates with a parallel port 190 (FIG. 2) which is driven by a second computer system 192. The second computer system 192 contains uncorrupted data such as a new valid BIOS to be loaded to the flash ROM 122.

Additionally, the microcontroller 174 of FIG. 2 receives battery statistics from one or more battery packs 191 and 193, which are connected in parallel to provide portable power V to the portable computer 80. Further, the battery packs 191 and 193 communicate over an inter-integrated circuit ($I^2C$) bus, a simple bi-directional two wire bus for efficiently controlling multiple integrated chips. Details of the $I^2C$ bus can be found in the "The $I^2C$-Bus and How to Use It (Including Specification)," published by Phillips Semiconductors, January 1992. Briefly, the $1^2C$ bus consists of two lines: a serial clock (SCL) and a serial data line (SDA). Each of these lines is bi-directional. The SCL line provides the clock signal for data transfers which occur over the $I^2C$ bus. Logic levels for this signal are referenced to VBATT-, which is common to all installed battery packs B. The SDA line is the data line for data transfers which occur over the $I^2C$ bus. Again, logic levels for this signal are referenced to VBATT-. As illustrated by a second installed battery pack 193, the battery microcontroller of any additional battery pack is also coupled to the MSIO 120 via the $1^2C$ bus. Low value series resistors (not shown) are typically provided at each device connection for protection against high-voltage spikes.

Each device connected to the $1^2C$ bus is recognized by a unique address—whether it is the MSIO 120 or the battery microcontroller of any installed battery packs 191 and 193. Both the MSIO 120 and battery microcontroller incorporate an on-chip interface which allows them to communicate directly with each other via the $1^2C$ bus. Using the $I^2C$ bus in cooperation with the master battery signal MSI'R__BAT reduces the number of interface signals necessary for efficient battery management. Co-pending U.S. patent application Ser. No. 08/573,296, entitled "BATTERY PACK WAKEUP" and filed on Dec. 15, 1995, now U.S. Pat. No. 5,641,587, illustrates various aspects of nickel-based and lithium ion battery packs and communications over a serial bus. This application is hereby incorporated by reference.

Further, the microcontroller 174 also receives inputs from a plurality of switches, including a computer lid opening switch 194, a power on switch 195, and a standby switch 196. The lid opening switch 194 senses when the lid of the computer system 80 is opened, indicating that the user is about to activate the computer system 80. The power on switch 195 allows the user to turn on the portable computer 80, while the standby switch 196 allows the user to put the portable computer system 80 to an idle mode or a sleep mode to conserve power. Preferably, the actuation of the switches 194, 195 and 196 generates an interrupt to the microcontroller 174 and causes the microcontroller 174 to exit its deep sleep mode, if the microcontroller 174 is in such a mode, and further causes the microcontroller 174 to branch to an appropriate interrupt handler to respond to the actuation of the switches or the insertion/removal of the battery packs 191 and 193.

Finally, the microcontroller 174 is connected to a keyboard 197 for receiving data entries from the user. The microcontroller 174 is further connected to a DC/DC converter 198 which provides regulated +5VDC and +12VDC to the VCC2 plane to power the portable computer 80. The DC/DC converter receives a DC voltage supplied by an AC/DC converter (not shown) which is connected to the AC power at a docking station (not shown). When the portable computer unit 80 is docked with its docking station, it communicates with peripheral devices, receives DC currents for charging batteries plugged into the portable computer 80 and for operating the portable computer unit 80. The DC/DC converter 198 has an enable input driven by the microcontroller 174 such that the microcontroller 174 can turn on or off the DC/DC converter 198.

Figure 3:
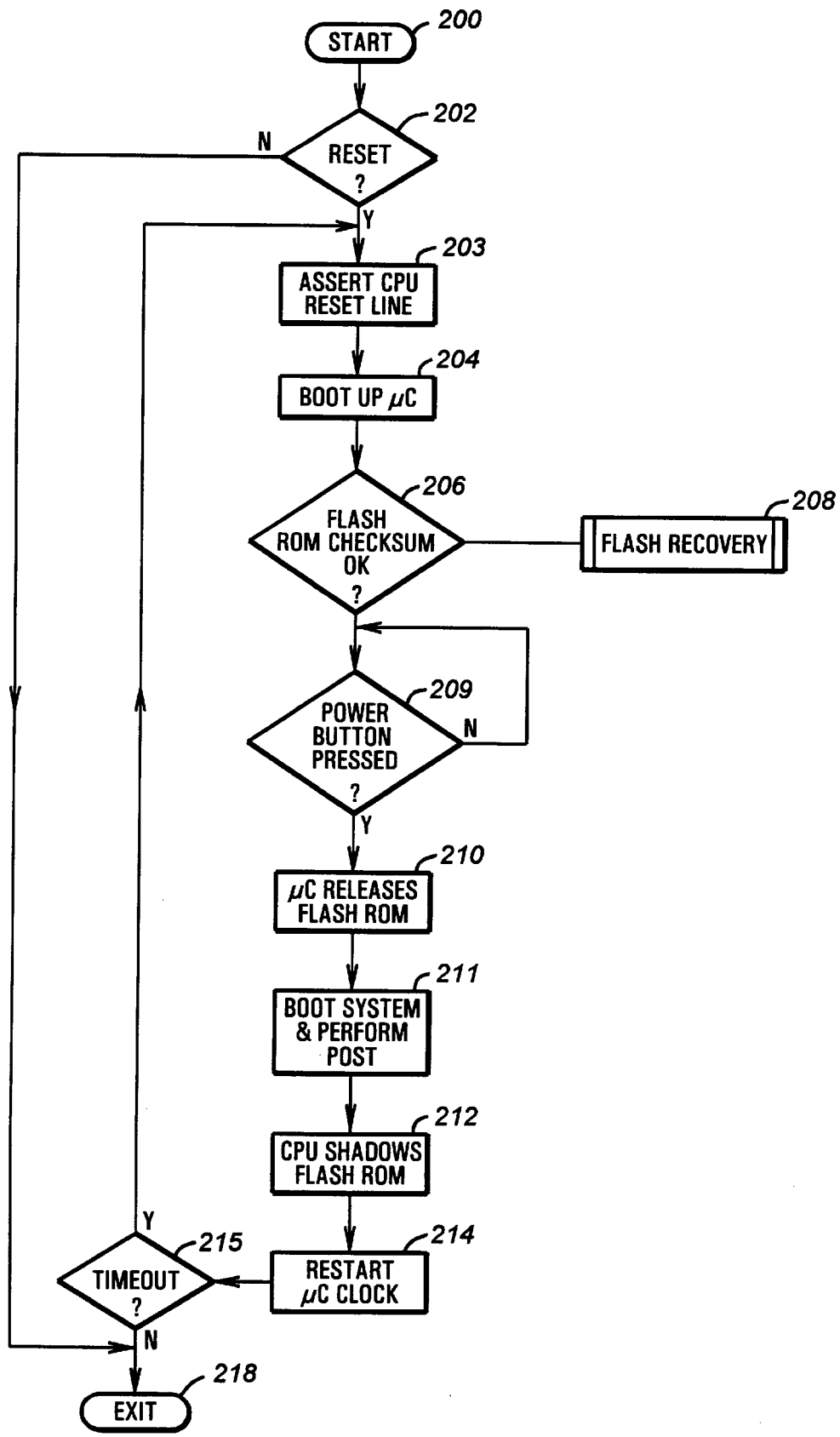
FIG. 3 is a flow chart of the process for booting up the microcontroller and the microprocessor of FIG. 1A.

FIG. 3 describes the basic power-up sequence in the computer of FIG. 1. In FIG. 3, the routine checks to see if a system reset has occurred in step 202. If not, the routine exits in step 218. Alternatively, the routine transfers to step 203 where the microprocessor or CPU 100 reset input remains asserted. In step 204, the microcontroller 174 boots-up using codes stored in the ROM 176. The microcontroller 174 boots up by executing the instructions located at address 0000h in the 8051 address space. The microcontroller 174 then jumps to another memory location to initialize the RAM 175 by clearing it.

Proceeding to step 206, the microcontroller 174 checks the integrity of the flash ROM 122 using an integrity checker. The integrity checker of step 206 performs a checksum computation on the bottommost 16 KB segment of the flash ROM 122 content. The checksum is computed at step 206 by adding, without carry, the lowest 8,192 16-bit words of the flash ROM. While the addition is being performed, the routine also verifies that the 16 KB are not all zero. If the flash ROM segment passes the checksum test, the routine proceeds to step 209. Alternatively, if the flash ROM 122 check-sum indicates a failure in step 206, the flash ROM 122 has been corrupted and needs to be reprogrammed in step 208. The apparatus and process for performing the flash recovery step 208 are disclosed in the previously incorporated co-pending patent application entitled "FLASH ROM PROGRAMMING."

Alternatively from step 206, if the flash ROM 122 memory passes the check-sum process, the routine waits until the user presses the power button in step 209. Once the power button has been actuated, the microcontroller 174 releases its ownership of the flash ROM 122 in step 210 by tristating its signal lines coupled to the flash ROM 122. Further, the microcontroller 174 preferably control the reset input of the CPU 100 through circuitry not shown, and the microcontroller 174 releases that reset input of the CPU 100 to allow the CPU 100 to boot-up with ownership of the flash ROM 122. When the Intel 80x86 CPU 100 of the preferred embodiment first powers up, the CPU 100 executes the instruction located 16 bytes from the highest memory address. For the 8086–8088 CPU, this address is FFFF0h. For the 80286 CPU, it is FFFFF0h, for the 80386 CPU, it is FFFFFFF0h, and for the 80486 CPU, it is FFFFFFF0h. Typical IBM PC/AT compatible systems have a jump instruction at this address, to the beginning of the power-on-self-test (POST) routine of the system ROM BIOS. The POST tests the microprocessor 100, memory 102, and other hardware components for their presence and integrity, and also initializes various interrupt vector table entries with default values pointing to handler routines within the system BIOS.

Next, in step 212, the CPU 100 performs a shadow operation to enhance the access speed to the routines stored in the BIOS. Conventionally, shadowing is performed by copying the contents of selected portions of the original reserved memory to be shadowed to predetermined temporary memory locations. Once the selected portions are transferred into these temporary memory locations, the selected portions of the original reserved memory are disabled, and the corresponding portions of shadowed memory are enabled. Then, in a second step, the contents of these temporary locations are copied into the shadow memory at the same memory address locations from which they originate. Thereafter, accesses to the selective portions of the original reserved memory result in the access of corresponding portions of a shadowed memory, now the RAM or DRAM main memory 102.

The portion of the DRAM main memory 102 which receives such a portion of the BIOS is sometimes referred to as the shadow RAM. More specifically, in the standard system architecture, the logical main memory address space is divided into a low memory range (0h–9FFFFh), a reserved memory range (A0000h–FFFFFh) and an extended memory range (100000h–FFFFFFh). In a typical system, the system ROM BIOS is located logically at addresses F0000h–FFFFFh, and is located physically on the ISA bus. Addresses C0000h–EFFFFh contain ROM BIOS portions of the specific add-on cards and are located physically on their respective card, on the ISA bus. Further, addresses A0000h–BFFFFh contain the video buffer, located physically on a video controller on the I/O bus. Duplicate memory space is typically provided in the dynamic RAM on the local bus for addresses C0000h–FFFFFh, and a user of the system can select during a setup procedure which portions of the ROM BIOS are to be shadowed by being copied into the duplicate DRAM space during boot up. The address of the shadow RAM area is then mapped into the address of the flash ROM 122 address space by the memory controller 101 Once shadowed, accesses to BIOS routines are accelerated because the RAM access time is much faster than the ROM access times.

From step 212, the routine of FIG. 3 proceeds to set a remap bit in step 213. The setting of the remap bit can be accomplished by writing a logical one to the flip-flop 350. Upon completing step 213, the computer system S is properly set up for executing from the shadowed ROM BIOS in the main memory array during a warm-boot rather than from the flash ROM 122, which leads to a contention for the resource or flash ROM 122. Once the remap bit is set, it is normally cleared during a shutdown of the computer system and during the power up process where the reset input of the flip-flop 360 is briefly asserted. The remap bit can also be cleared under software control in the event that the ROM shadowing is not wanted for specific reasons, such as software compatibility in rare instances.

From step 213, the routine of FIG. 3 proceeds to step 214 where it restarts the microcontroller clocks. In step 214, the CPU 100 returns ownership of the flash ROM 122 back to the microcontroller 174 before the microcontroller 174 is restarted. Once the microcontroller 174 has been restarted, the CPU 100 writes to a mailbox register which in turn generates an interrupt signal to the microcontroller 174. Upon receipt of the interrupt signal, the microcontroller 174 wakes up and assumes ownership of the flash ROM 122. If the CPU 100 fails to write to the mailbox, register, Timer_0 will overflow and generate a timeout. In the event of a timeout in step 215, the routine loops backs to step 203 where the microcontroller soft-resets, or executes at address 000h. Alternatively, if the CPU 100 timely writes to the mailbox register, the routine exits in step 218.

Figure 4:
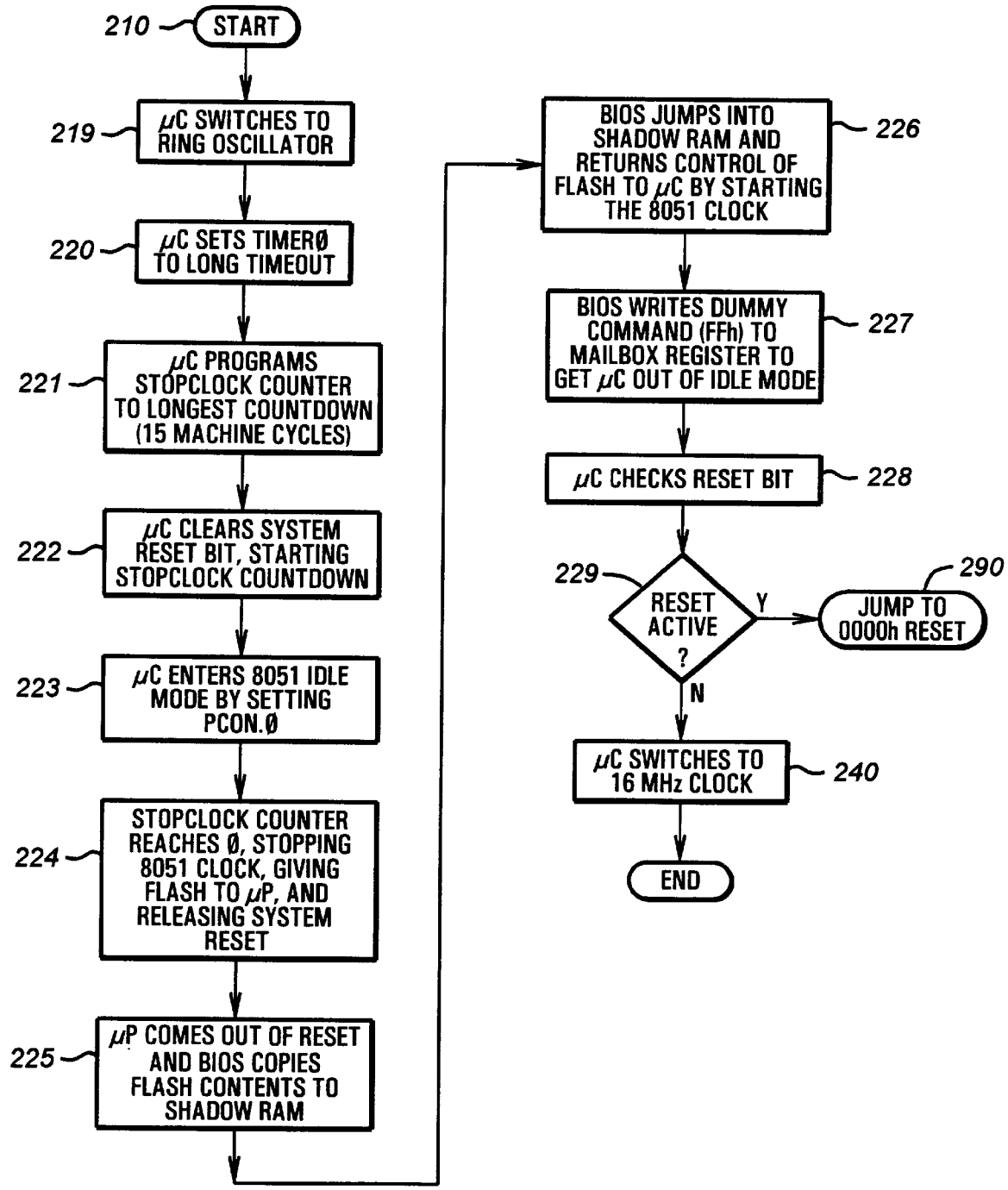
FIG. 4 is a flow chart showing the process of booting up the microprocessor of FIG. 1A after the microcontroller has booted up.

FIG. 4 describes in more detail the process in which the microcontroller 174 releases the flash ROM 122 to allow the CPU 100 to boot up after a reset. In FIG. 4, from the start step 210, the microcontroller 174 switches to the ring oscillator 185 in step 219. From step 219, the microcontroller 174 sets the Timer_0 to a predetermined long timeout in step 220. Next, the microcontroller 174 programs the stop clock counter to the longest countdown in step 221. Preferably, the longest countdown period is 15 machine cycles. From step 221, the microcontroller 174 clears the system reset bit and starts the stop clock countdown in step 222. Next, in step 223, the microcontroller 174 enters the 8051 IDLE mode by setting a predetermined bit in step 223. Next, in step 224, the stop clock counter reaches zero. This event stops the 8051 clock, and provides the flash ROM 122 back to the CPU 100. Further, this event releases the system reset line in step 224 to allow the CPU to boot. From step 224, the CPU 100 comes out of reset and the BIOS collies the flash contents to the shadow RAM in step 225. From step 225, the BIOS jumps into the shadow RAM and returns control of the flash to the microcontroller 174 by starting the microcontroller clock in step 226. Next, the BIOS writes a dummy command such as a FFh command to a mailbox register to get the microcontroller 174 out of the IDLE mode in step 227. From step 227, the microcontroller 174 checks its reset bit in step 228. If the reset bit indicates that the reset is active in step 229, the routine jumps to the reset vector at 00h in step 290. Alternatively, from step 229, if the reset is inactive, the microcontroller 174 switches to the 16 MHz clock in step 240 before it exits FIG. 4.

Figure 5:
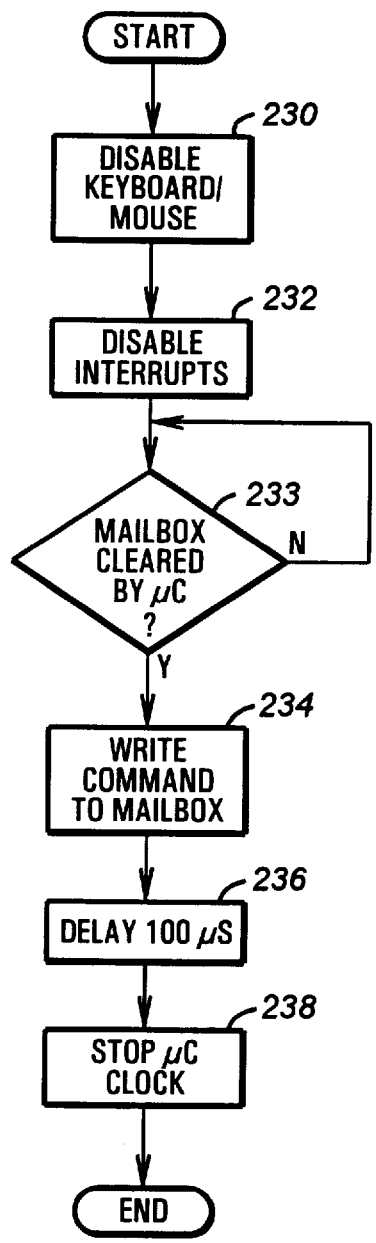
FIG. 5 is a flow chart showing the process of requesting ownership to the flash ROM of FIG. 1A.

FIG. 5 describes in details the arbitration process performed by a software arbiter which grants access to the flash ROM 122 to the CPU 100 after the CPU 100 has released the flash ROM 122 in step 214 of FIG. 3. The routine of FIG. 5 allows the CPU 100 to regain control over the flash ROM 122 when necessary to, for example, load foreign language options or record plug-and-play parameters into the flash ROM 122. Additionally, the CPU 100 can regain control over the flash ROM 122 if the BIOS routines in the flash ROM 122 need to be updated. For example, errors in the BIOS code requiring corrections and new versions or new releases of the boot code are common, so that the boot code stored in the flash ROM 122 is generally subject to modifications. The ability to upgrade the flash ROM 122 is thus a desirable feature as it positively affects the economics of operating and maintaining the computer system. In the instant case, a user may update the flash ROM 122 as specified in the copending case previously incorporated by reference.

At the beginning of FIG. 5, if necessary, the routine disables the keyboard and mouse in step 230. The disabling of the keyboard and the mouse is not necessary after a hard reset because these devices are automatically disabled at power on. However, when the CPU needs to access the flash ROM 122 after the initial boot-up period, the keyboard and the mouse need to be disabled as the microcontroller 174 can no longer service the devices after clock input to the microcontroller 174 has been stopped.

After the system has disabled the keyboard and mouse devices, the routine of FIG. 5 disables the interrupts to the CPU 100 in step 232 because the remaining section of FIG. 5 is a timing critical section. The interrupts are preferably disabled using the 80x86 CLI instruction which stops the host CPU 100 from processing further interrupts. Next, in step 233, the routine checks if the mailbox has been cleared by the microcontroller 174. If not, the routine simply waits for the clearing operation. Alternatively, once the microcontroller 174 clears the mailbox in step 233, the routine writes a specific command to the mailbox register MailBox_0 in step 234. Preferably, the routine writes to a specific index and then writes a specific data command.

Figure 6:
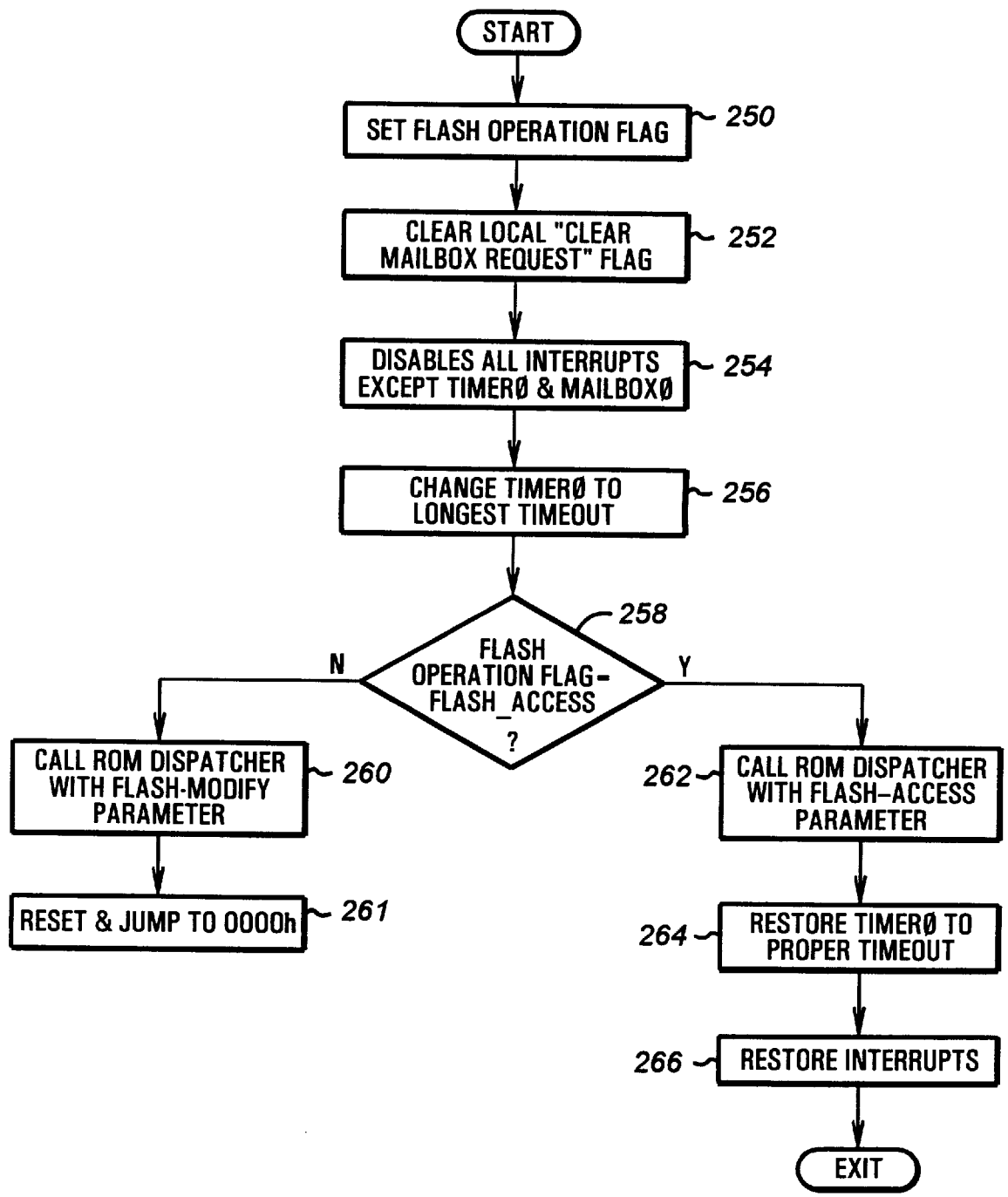
FIG. 6 is a flow chart showing the process using codes stored in the flash ROM of FIG. 2 for processing a flash ROM access request from the microprocessor.

Upon receipt of the request from the CPU 100 to access the flash ROM 122, the microcontroller 174 clears the mailbox request in step 252 of FIG. 6 to acknowledge the flash ROM access request from the CPU. During this period, the routine waits for MailBox_0 register to clear to indicate that the microcontroller 174 has received the flash ROM 122 access request and that the microcontroller 174 is about to suspend its operation via the execution of the IDLE instruction of the 8051 microcontroller 174. The routine then delays for approximately 100 microseconds in step 235 to let the microcontroller 174 enter its idle mode before the routine stops the microcontroller 174 clock in step 238. At this point, the microcontroller 174 is suspended and the host CPU 100 has control of the flash ROM 122. Preferably, stopping the clock of the microcontroller 174 also causes the flash ROM 122 to be multiplexed and accessible to the CPU 100.

Turning now to FIG. 6, the routine stored in the flash ROM 122 and executed by the microcontroller 174 to relinquish control of the flash ROM 122 is disclosed. Preferably, the microcontroller 174 executable code is located in the bottom 32K of the flash ROM 122. The code is located in the flash ROM 122, as opposed to the mask ROM 176 so that the code can be updated if necessary.

At the beginning of FIG. 6, the CPU 100 sets a flash operation flag to indicate the appropriate operations to be performed. In one type of operation, the flash ROM 122 is only accessed and not altered. In a second type of operation, the flash ROM 122 is actually modified by the CPU 100. In that case, the entire flash ROM 122 or portions of the flash ROM 122 may be overwritten. The modification of the flash ROM 122 requires that the microcontroller 174 be restarted as the microcontroller 174 cannot simply return to its interruption point because that code may have been changed. Thus, when the flash ROM 122 is modified or in the event of a soft reset, the microcontroller 174 jumps to reset address location 0. In the event where the flash ROM 122 is only read from, as at boot time, or if some portion of the flash ROM 122 will be written to but not the portion which contains executed, then when the system currently being executed, then when the system returns control of the flash ROM 122 back to the microcontroller 174, the microcontroller 174 continues execution of codes where the last memory location left off.

During step 250, the microcontroller 174 owns the flash ROM 122. After the CPU 100 has set the appropriate flag in step 250 by writing a specific value to a mailbox register, the microcontroller 174 clears the local flag indicating that a mailbox register request has occurred in step 252. Next, in step 254, the routine disables all interrupts except the interrupts for Timer_0 and MailBox_0. Timer_0, the output of the timer 177, is programmed to interrupt at some periodic level, typically one millisecond. Either one of these interrupts wakes up the controller 174 from the idle mode, if the microcontroller 174 was in idle mode, and allow the 8051 microcontroller 174 to operate.

Timer_0 is essentially used as a fail safe mechanism in the event that power is lost. Normally, the microcontroller 174 is woken from its idle mode when the CPU 100 writes to MailBox_0. In the event where primary power is lost such that a hard reset is generated, the CPU 100 releases control of the flash ROM 122 and microcontroller 174 starts running. In this case, Timer_0 simply runs out of time. When Timer_0 reaches 0, it generates an interrupt to reboot the microcontroller 174 and to reset the entire computer system. Thus, in step 256, the routine changes the setting of Timer_0 to the longest timeout, preventing an undesired deadman timeout. In the preferred embodiment which runs at 16 MHz, the longest delay period for Timer_0 is 48 milliseconds.

From step 256 of FIG. 6, the microcontroller 174 detects the type of flash operation to be performed in step 258. From step 258, if the requested operation is not flash access, the routine proceeds to step 260 where it calls a ROM dispatcher routine with the flash modify parameters to indicate that the flash ROM is to be updated. Next, the routine of FIG. 6 causes a reset, or a jump to 0000h, in step 261.

Alternatively, in step 258, if the flash operation flag indicates that the CPU 100 is requesting a flash access operation, the routine calls the ROM dispatcher routine with the parameters configured to perform a flash access operation in step 262. From step 262, the routine proceeds to step 264 where Timer_0 is restored to its proper timeout period, which is generally a one millisecond delay Further, the interrupts are enabled in step 266 so that normal interrupt operations can occur before the routine of FIG. 6 exits.

Figure 7:
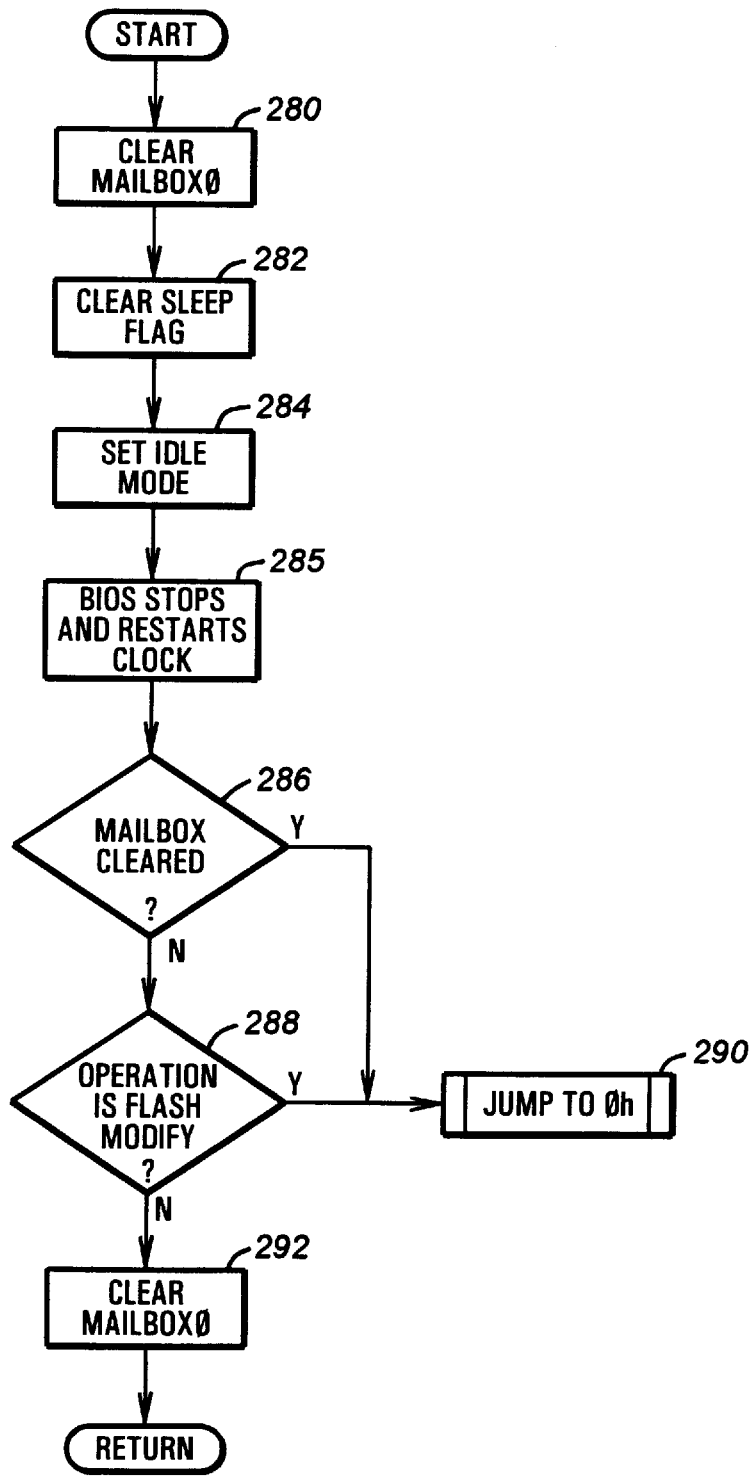
FIG. 7 is a flow chart showing the process using codes stored in the built-in ROM of the microcontroller of FIG. 2 for processing a flash ROM access request from the microprocessor.

FIG. 7 illustrates in more detail the routine stored in the ROM 176 and executed by the microcontroller 174 for processing a request from the CPU 100 to access the flash ROM 122. In step 280, the routine clears MailBox_0. Concurrently with step 280, the CPU 100 should also disable its interrupts because, as soon as MailBox_0 has been cleared, the CPU 100 must delay for about 100 microseconds before writing to a register to stop the microcontroller 174 clock and take control of the flash ROM 122 (see step 260 in FIG. 6).

When the CPU 100 detects that MailBox_0 has been cleared at step 280, the CPU 100 starts its 100 microsecond countdown. Next, in step 282, the routine clears a sleep flag in the control register of the microcontroller 174. The sleep flag is cleared to allow the microcontroller 174 to enter the idle mode via the IDLE instruction of the 8051 microcontroller 174. The microcontroller 174 stops executing instructions until it receives an interrupt which may be either a timer interrupt or an external interrupt. In step 284, the idle mode is entered by executing the IDLE instruction of the 8051 microcontroller 174. Upon the execution of the IDLE instruction, the microcontroller 174 releases, or tristates, the control, address and clock signals driving the flash ROM 122 inputs, allowing the CPU 100 to drive those lines instead.

After the 100 microsecond delay period, the CPU 100 stops the microcontroller 174's clock by writing to a control register. The write operation stops the Timer_0. The microcontroller 174 will remain in idle mode until its clock has been started and one or more interrupts occur. In step 285, the routine halts and waits for the BIOS to stop and restart the clock to the microcontroller 174. When the CPU 100 is ready to return the ownership of the flash ROM 122 back to the microcontroller 174, the CPU 100 starts the clock of the microcontroller 174 again by writing to a control register. Next, the BIOS code writes a dummy instruction such as the FFh instruction to Mail_0 to generate an interrupt to the microcontroller 174 to bring the microcontroller 174 out of the idle mode.

Upon being woken, the microcontroller 174 examines MailBox_0. If cleared, the microcontroller 174 assumes that an error has occurred or something has failed since the BIOS code of the CPU 100 is expected to write a non-zero value to MailBox_0. As a fail safe mechanism, the microcontroller 174 reinitializes the entire system in step 290 by executing the routine of FIG. 3. As such, the microcontroller 174 performs a soft reset by jumping to address location zero to once more perform the checksum in the flash ROM 122 just as if it had started from a cold reset. Alternatively, if MailBox__0 contains a non-zero value, the microcontroller 174 assumes that the BIOS of the CPU 100 had requested the flash ROM 122 and had properly returned the flash ROM 122 to the microcontroller 174. At this point, if the flash ROM 122 ownership arbitration had been successfully completed, the microcontroller 174 continues to execute from the location just before it was interrupted by the CPU 100's request for access to the flash ROM 122. From step 288, if the requested flash ROM 122 operation does not modify the flash ROM 122, the routine clears the MailBox__0 before exiting the routine of FIG. 7. The process thus safely allows the microcontroller 174 to reenter the code if the component of flash ROM 122 containing the microcontroller 174 code has not changed or power has not been interrupted.

Figure 8:
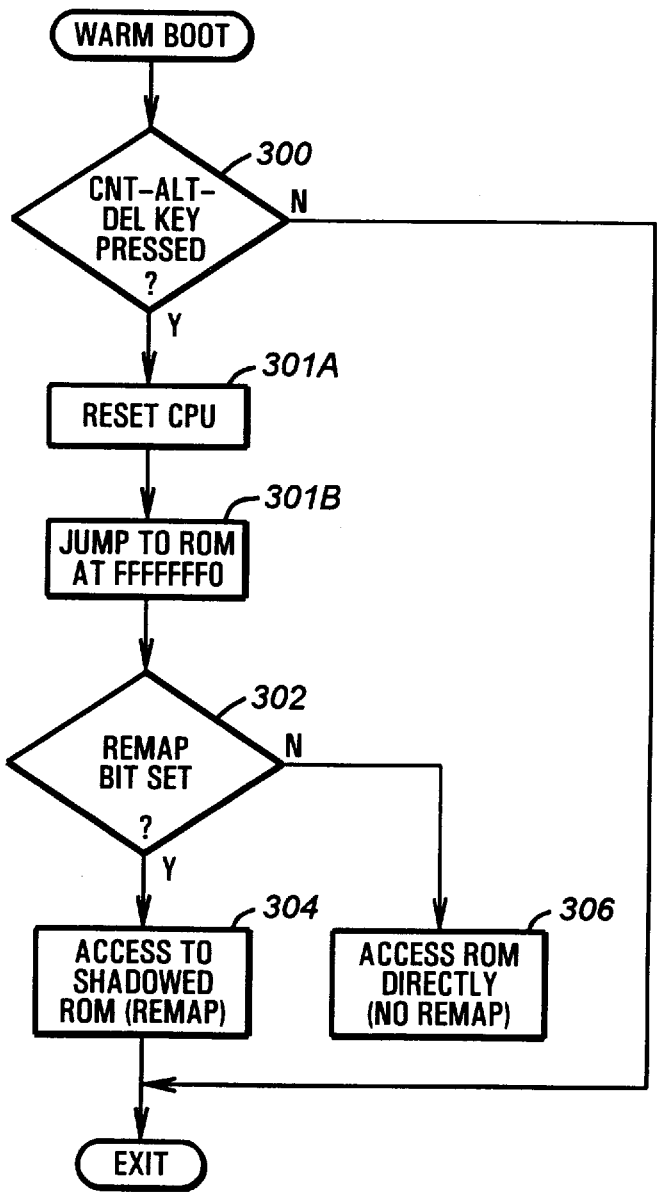
FIG. 8 is a flow chart showing the warm boot process with the remap bit in accordance with the present invention.

Turning now to FIG. 8, the routine for performing a warm-boot for the computer system of the present invention is shown. In FIG. 8, the routine detects the simultaneous actuation of the control-alternate-delete key combination in step 300. If the combination is not actuated, the routine of FIG. 8 simply exits. Alternatively, when the user presses all three keys to request a warm reboot, the routine of FIG. 8 transitions from step 300 to step 301 A where it causes the CPU to be reset. Further, in step 301B, the CPU jumps to the ROM version located at FFFFFFF0h. Next, in step 302, the routine of FIG. 8 detects whether the remap bit had previously been asserted. If so, the routine transitions to step 304 where the CPU 100 fetches the boot-code directly from the shadow ROM address region using the remapper R of FIG. 1C. Alternatively, in the event that the remap bit had not been asserted such that the content of the flash ROM 122 had not been shadowed into the memory array, the routine of FIG. 8 performs accesses directly from the ROM in step 306. From step 300, 304 or 306, the operation of the routine of FIG. 8 is completed.

Thus, according, to the invention, the flash ROM 122 is initially owned by the microcontroller 174. After checking the integrity of the flash ROM 122, the microcontroller 174 turns over the ownership of the flash ROM 122 to the CPU 100. This is achieved by placing the microcontroller 174 in an idle mode to tri-state the lines driving the flash ROM 122 via mailbox instructions and further by turning off the clock generator to the microcontroller 174 while releasing the system reset to start the CPU 100. Once the CPU 100 owns the flash ROM 122, the microprocessor 100 shadows necessary portions of the flash ROM 122 BIOS into the main memory array and sets a remap bit to redirect warm reboots to access the shadowed ROM.

Once the necessary portion of the flash ROM 122 has been shadowed and the remap bit set, the microprocessor 100 returns ownership of the flash ROM 122 to the microcontroller 174. This is accomplished by starting the microcontroller 174's clock and writing a dummy instruction such as FFh to wake the microcontroller 174 from its idle mode. In the event that the CPU 100 needs to regain access to the flash ROM 122 contents, the CPU 100 writes a predetermined value to the mailbox register to cause the microcontroller 174 to execute the IDLE instruction. Further, the clock provided to the microcontroller 174 is halted. The execution of the IDLE instruction causes the microcontroller 174 to tristate the I/O lines driving the address, data, and control lines of the flash ROM 122 such that the CPU 100 can access the flash ROM 122. Upon completion of the access to the flash ROM 122, the CPU 100 starts the microcontroller 174's clock and writes a non-zero value to MailBox__0 to generate an interrupt to the microcontroller 174 and to wake-up the microcontroller 174. Upon waking up, the microcontroller 174 owns the flash ROM 122 and can continue execution until the next request for access to the flash ROM 122 from the CPU 100.

Furthermore, when the user executes a warm reboot operation, the CPU 100 executes from locations FFFF–FFFC0h and the MPC 101 checks if the remap bit is set. If so, the MPC 101 changes or remaps the address to 000F–FFF0h, thus directing the cycle to the shadowed ROM in the main memory array. Thus, even if the microcontroller 174 is accessing the flash ROM 122 during the warm reboot, the rebooting of the CPU 100 does not cause contention problems with the microcontroller 174 for the shared resource or flash ROM 122. In this manner, the CPU 100 can perform the warm reboot without causing a system lock-up as caused by the concurrent accessing of the flash ROM 122 by the microcontroller 174 when the user decides to perform the warm reboot. Thus, the system cost is reduced, the system reliability is enhanced, while the system accessibility to the flash ROM after the boot-up period is still preserved.

Although the present invention discloses the use of a mailbox for interprocessor communication and/or coordination, one skilled in the art would realize that other methods of coordinating and scheduling accesses to a shared resource may be used. Specifically, the present invention contemplates that alternative methods of communication such as any IBM PC compatible I/O ports, including I/O ports located at 60h and 64h, can be used in place of mailbox registers. Further, although the preferred embodiment shows the sharing of the flash ROM between a microprocessor and a microcontroller, the present invention contemplates that other devices or resources can be shared as well, including RAM and peripherals, among others. Additionally, the present invention contemplates that other processing devices such as digital signal processors, coprocessors, and custom processors may be used in place of the microcontroller.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computer system, comprising:

a processor;

a peripheral device coupled to said processor for storing boot data;

a resource coupled to said processor, said resource storing a resource code located at a resource address;

a system memory coupled to said processor, said system memory having a shadow region adapted to receive said resource code into said shadow region after said processor boots up, said shadow region having a shadow address;

a flag coupled to said processor, said flag being asserted after said boot code has been copied into said shadow region;

an address remapper coupled to said flag, said resource, said system memory and said processor, said address remapper substituting said resource address with said shadow address when said resource is accessed and said flag is asserted;

a microcontroller coupled to said resource and said processor, said microcontroller allowing said processor to boot from said stored boot data after said microcontroller boots, said microcontroller having an active mode for engaging said resource and an idle mode for disengaging said resource; and an arbiter coupled to said processor, said microcontroller and said resource, said arbiter adapted to receive a request from said processor to access said resource, said arbiter placing said microcontroller in the idle mode before granting said processor access to said resource, said arbiter further placing said microcontroller into the active mode to engage said resource after said processor releases said resource.

2. The computer system of claim 1, wherein said microcontroller is clocked by a clock input and wherein said arbiter further comprises:

a mailbox register adapted to receive said access request from said processor;

a variable clock generator coupled to said microcontroller clock input, said variable clock generator deasserting said clock input upon the expiration of a predetermined period.

3. The computer system of claim 2, wherein said variable clock generator modulates said clock input to place said microcontroller into the active mode after said processor releases said resource.

4. The computer system of claim 1, wherein said resource is a non-volatile memory.

5. The computer system of claim 4, wherein said non-volatile memory is a flash read-only-memory (ROM).

6. The computer system of claim 4, wherein said non-volatile memory is a non-volatile random-access-memory (NV-RAM).

7. The computer system of claim 4, wherein said non-volatile memory stores a primary code for booting up said processor.

8. The computer system of claim 7, wherein said primary code is a code for booting said processor sufficiently to further boot from said stored boot data.

9. The computer system of claim 7, wherein said primary code comprises a power on self test code and a basic input output system code.

10. The computer system of claim 7, wherein said processor copies a portion of said primary code into said shadow region after said processor boots up.

11. The computer system of claim 7, wherein said processor releases said non-volatile memory to said microcontroller after shadowing said primary code.

12. The computer system of claim 4, wherein said non-volatile memory stores a secondary code for execution by said microcontroller.

13. The computer system of claim 1, further comprising a code update system having updated data and a code update data port, said computer system comprising:

a data port coupled to said microcontroller and said code update data port, said data port receiving said updated data; and an integrity checker coupled to said microcontroller for checking the integrity of said code in said resource; and a programmer coupled to said microcontroller for receiving said updated data from said data port and updating said resource if the integrity of said resource has been compromised.

14. A method for sharing a non-volatile memory in a computer system, said computer system having a processor, a system memory coupled to said processor, a display coupled to said processor for communicating with the user, a disk drive coupled to said processor for storing data, a resource coupled to said processor, and a microcontroller coupled to said resource and said processor, said method comprising the steps of:

shadowing said resource in said system memory;

setting a flag to indicate that said resource has been shadowed;

detecting a warm boot request to said processor and if said warm boot request occurs when said flag is set, diverting said access to said system memory; and responding to a resource access request by:
idling said microcontroller in response to said resource access request;
granting said processor access to said resource after said microcontroller as been idled;
releasing said resource from said processor; and
activating said microcontroller to engage said resource after said processor releases said resource.

15. The method of claim 14, wherein said microcontroller is clocked by a clock input and wherein said idling step further comprises the steps of:

writing to a mailbox register to request said resource;

delaying a predetermined period from said writing step; and deasserting said clock input upon the expiration of said predetermined period.

16. The method of claim 15, further comprising the step of releasing said resource to said microcontroller after completing access to said resource.

17. The method of claim 16, further comprising the step of modulating said clock input to restart said microcontroller after said releasing step.

18. The method of claim 14, wherein said system memory has a shadow region and wherein said resource has a code, further comprising the step of shadowing a portion of said code into said shadow region after booting up said processor.

19. The method of claim 18, further comprising the step of releasing said resource to said microcontroller after said shadowing step.

20. The method of claim 14, further comprising the steps of updating said resource with a new code.

21. The method of claim 20, wherein said updated data is an updated microcontroller code, further comprising the step of rebooting said microcontroller after said microcontroller code updating step.

22. An apparatus for arbitrating accesses in a computer, said computer having a processor and a system memory coupled to said processor, said apparatus comprising:

a resource coupled to said processor, said resource storing a resource code located at a resource address;

a system memory coupled to said processor, said system memory having a shadow region adapted to receive said resource code into said shadow region after said processor boots up, said shadow region having a shadow address;

a flag coupled to said processor, said flag being asserted after said boot code has been copied into said shadow region;

an address remapper coupled to said flag, said resource, said system memory and said processor, said address remapper substituting said resource address with said shadow address when said resource is accessed and said flag is asserted;

a microcontroller coupled to said resource and said processor, said microcontroller allowing said processor to boot from said stored boot data after said microcontroller boots, said microcontroller having an active mode for engaging said resource and an idle mode for disengaging said resource; and an arbiter coupled to said processor, said microcontroller and said resource, said arbiter adapted to receive a request from said processor to access said resource, said arbiter placing said microcontroller in the idle mode before granting said processor access to said resource, said arbiter further placing said microcontroller into the active mode to engage said resource after said processor releases said resource.

23. The apparatus of claim 22, wherein said microcontroller is clocked by a clock input, said apparatus further comprises:

a mailbox register adapted to receive said access request from said processor;

a variable clock generator coupled to said microcontroller clock input, said variable clock generator deasserting said clock input upon the expiration of a predetermined period.

24. The apparatus of claim 23, wherein said variable clock generator modulates said clock input to place said microcontroller into the active mode after said processor releases said resource.

25. The apparatus of claim 22, wherein said resource is a non-volatile memory.

26. The apparatus of claim 25, wherein said non-volatile memory is a flash read-only-memory (ROM).

27. The apparatus of claim 25, wherein said non-volatile memory is a non-volatile random-access-memory (NV-RAM).

28. The apparatus of claim 25, wherein said non-volatile memory stores a primary code for execution by said processor.

29. The apparatus of claim 28, wherein said primary code is a code for booting said processor such that it can further boot from said stored boot data.

30. The apparatus of claim 28, wherein said primary code comprises a power on self test code and a basic input output system code.

31. The apparatus of claim 28, wherein said system memory has a shadow region and wherein said processor copies a portion of said primary code into said shadow region after said processor boots up.

32. The apparatus of claim 31, wherein said processor releases said non-volatile memory to said microcontroller after shadowing said primary code.

33. The apparatus of claim 26, wherein said non-volatile memory stores a secondary code for execution by said microcontroller.

34. The apparatus of claim 22, further comprising a code update system having updated data and a code update data port, said apparatus further comprising:

a data port coupled to said microcontroller and said code update data port, said data port receiving said updated data; and an integrity checker coupled to said microcontroller for checking the integrity of said code in said resource; and a programmer coupled to said microcontroller for receiving said updated data from said data port and updating said resource if the integrity of said resource has been compromised.

* * * * *